US009162404B2

(12) United States Patent
Doerr

(10) Patent No.: US 9,162,404 B2
(45) Date of Patent: Oct. 20, 2015

(54) RADIAL OPTICAL COUPLER

(75) Inventor: Christopher Doerr, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 525 days.

(21) Appl. No.: 13/041,366

(22) Filed: Mar. 5, 2011

(65) Prior Publication Data

US 2012/0224805 A1  Sep. 6, 2012

(51) Int. Cl.
| | | |
|---|---|---|
| G02B 6/28 | (2006.01) |
| B23P 13/00 | (2006.01) |
| B29D 11/00 | (2006.01) |
| G02B 6/124 | (2006.01) |
| G02B 6/30 | (2006.01) |
| G02B 27/09 | (2006.01) |
| G02B 27/28 | (2006.01) |
| G11B 7/1353 | (2012.01) |
| G11B 7/1374 | (2012.01) |
| G02B 6/12 | (2006.01) |

(52) U.S. Cl.
CPC .......... B29D 11/00663 (2013.01); G02B 6/124 (2013.01); G02B 6/30 (2013.01); G02B 27/0905 (2013.01); G02B 27/0944 (2013.01); G02B 27/286 (2013.01); G11B 7/1353 (2013.01); G11B 7/1374 (2013.01); *G02B 2006/12147* (2013.01)

(58) Field of Classification Search
CPC .................................... G02B 6/28; G02B 6/34
USPC ............................................................ 385/46
See application file for complete search history.

(56) References Cited

U.S. PATENT DOCUMENTS

| | | | | |
|---|---|---|---|---|
| 5,127,733 A | * | 7/1992 | Allgauer ....................... 356/482 |
| 5,357,591 A | * | 10/1994 | Jiang et al. ..................... 385/37 |
| 5,621,715 A | * | 4/1997 | Ohyama ................... 369/112.12 |
| 5,933,120 A | * | 8/1999 | Manasson et al. ............. 343/788 |
| 6,534,429 B1 | | 3/2003 | Jackson |
| 6,535,678 B1 | | 3/2003 | Yamauchi et al. |
| 6,594,429 B1 | | 7/2003 | White |

(Continued)

FOREIGN PATENT DOCUMENTS

| | | |
|---|---|---|
| CN | 1629662 A | 6/2005 |
| EP | 0360209 A2 | 3/1990 |

(Continued)

OTHER PUBLICATIONS

PCT International Search Report, PCT/US2012/025344, International Filing Date of Feb. 16, 2012, Date of Mailing of Search Report Jan. 21, 2013, 3 pgs.

(Continued)

*Primary Examiner* — Kaveh Kianni
(74) *Attorney, Agent, or Firm* — Hitt Gaines, PC

(57) ABSTRACT

An optical device includes an optical grating coupler and a plurality of optical waveguides coupled thereto. The optical grating coupler is formed along a planar surface of a substrate, and includes a pattern formed by ridges concentrically located on the surface about a center thereon. Each adjacent pair of ridges is separated by a groove. Each waveguide of the plurality of waveguides is oriented about radially with respect to the center, and has a first end that terminates near an outermost one of the ridges. The first ends are about uniformly spaced along the outermost one of the ridges.

11 Claims, 16 Drawing Sheets

(56) References Cited

U.S. PATENT DOCUMENTS

| | | | |
|---|---|---|---|
| 6,711,334 B2 * | 3/2004 | Szkopek et al. | 385/127 |
| 6,782,148 B2 | 8/2004 | Eggleton et al. | |
| 6,915,077 B2 | 7/2005 | Lo | |
| 6,956,987 B2 * | 10/2005 | Doerr | 385/17 |
| 7,184,627 B1 * | 2/2007 | Gunn et al. | 385/37 |
| 7,317,857 B2 | 1/2008 | Manyam et al. | |
| 7,343,066 B2 | 3/2008 | Doerr et al. | |
| 7,376,309 B2 * | 5/2008 | Gulde | 385/39 |
| 7,424,195 B2 | 9/2008 | Andrieu et al. | |
| 7,474,825 B1 * | 1/2009 | Horst et al. | 385/37 |
| RE41,570 E * | 8/2010 | Greiner et al. | 385/37 |
| RE42,540 E * | 7/2011 | Iazikov et al. | 385/24 |
| RE43,226 E * | 3/2012 | Iazikov et al. | 385/14 |
| 2003/0174985 A1 | 9/2003 | Eggleton et al. | |
| 2005/0100300 A1 | 5/2005 | Joyner et al. | |
| 2005/0135748 A1 | 6/2005 | Yamazaki | |
| 2005/0147355 A1 * | 7/2005 | Ilchenko | 385/50 |
| 2006/0127024 A1 * | 6/2006 | Smith et al. | 385/132 |
| 2006/0285795 A1 * | 12/2006 | Fondeur | 385/37 |
| 2007/0019905 A1 | 1/2007 | Mahrt et al. | |
| 2007/0201796 A1 * | 8/2007 | Gulde | 385/39 |
| 2008/0142828 A1 | 6/2008 | Yang | |
| 2010/0209045 A1 * | 8/2010 | Okayama | 385/37 |
| 2010/0329670 A1 | 12/2010 | Essiambre | |
| 2010/0329671 A1 | 12/2010 | Essiambre | |
| 2011/0243574 A1 | 10/2011 | Essiambre et al. | |
| 2012/0170933 A1 | 7/2012 | Doerr et al. | |
| 2012/0183304 A1 | 7/2012 | Winzer et al. | |
| 2012/0224805 A1 | 9/2012 | Doerr | |
| 2012/0224810 A1 | 9/2012 | Doerr | |
| 2012/0251126 A1 | 10/2012 | Winzer et al. | |
| 2013/0209022 A1 | 8/2013 | Doerr | |

FOREIGN PATENT DOCUMENTS

| | | | | |
|---|---|---|---|---|
| EP | 419257 A2 * | 3/1991 | | G02B 5/30 |
| EP | 709938 A2 * | 5/1996 | | H01S 3/08 |
| JP | 62187310 A | 8/1987 | | |
| JP | 63150981 A * | 6/1988 | | H01S 3/18 |
| JP | 02191916 A * | 7/1990 | | G02F 1/295 |
| JP | H02191916 A | 7/1990 | | |
| JP | 3246510 A | 11/1991 | | |
| JP | H05218378 A | 8/1993 | | |
| JP | H06281824 A | 10/1994 | | |
| JP | 07335855 A * | 12/1995 | | H01L 27/15 |
| JP | 11134696 A * | 5/1999 | | G11B 7/135 |
| WO | 2010117881 A1 | 10/2010 | | |

OTHER PUBLICATIONS

Patent Abstracts of Japan, Publication No. 09-218318, published Aug. 19, 1997, 1 pg.
Chen, Xia et al., "Polarization-Independent Grating Couplers for Silicon-on-Insulator Nanophotonic Waveguides", Optics Letters, Feb. 8, 2011, 4 pages.
Mekis, Attila, et al., "A Grating-Coupler-Enabled CMOS Photonics Platform", IEEE Journal of Selected Topics in Quantum Electronics, vol. 17, No. 3, Nov. 29, 2010, 12 pages.
Gloge, D. et al., "Impulse Response of Fibers With Ring-Shaped Parabolic Index Distribution", Bell System Tech. J., vol. 52, No. 7, Sep. 1973, pp. 1161-1168.
Kogelnik, H., "Theory of Optical Waveguides", Guided-Wave Optoelectronics, Springer-Verlag, Berlin, 1990, pp. 12-17.
Lee, B. G. et al., "120-Gb/s 100-m Transmission in a Single Multicore Multimode Fiber Containing Six Cores Interfaced with a Matching VCSEL Array", Photonics Society Summer Topical Meeting Series, Jul. 19-21, 2010 IEEE, TuD4.4, 16.30-16.45, pp. 223-224.
Doerr, Christopher Richard, U.S. Appl. No. 13/077,149, filed Mar. 31, 2011, "Optical Fibers With Tubular Optical Cores", 36 pages.
Winzer, Peter J., U.S. Appl. No. 13/076,917, filed Mar. 31, 2011, "Multi-Core Optical Fiber and Optical Communication Systems," 22 pages.
Doerr, Christopher R., U.S. Appl. No. 13/041,364, filed Mar. 5, 2011, "Polarization-Independent Grating Optical Coupler," 40 pages.
Ryf, R. et al., "Space-division multiplexing over 10 km of three-mode fiber using coherent 6×6 MIMO processing", Optical Fiber Communication Conference (OFC), Post deadline paper PDPB10, Mar. 8, 2011, OSA/OFC/NFOEC 2011, 3 pgs.
Doerr, Christopher R. et al., "Circular grating coupler for creating focused azimuthally and radially polarized beams", Optics Letters, vol. 36, No. 7, Apr. 1, 2011, pp. 1209-1211.
Dorn, R. et al., "Sharper Focus for a Radially Polarized Light Beam", Physical Review Letters, vol. 91, No. 23, Dec. 5, 2003, pp. 233901-1-233901-4.
Gupta, Devki Nandan, et al., "Electron Acceleration to GeV energy by a radially polarized laser", Physics Letters A, 368, 2007, pp. 402-407.
Ibanescu, M., et al., "An All-Dielectric Coaxial Waveguide", Science, vol. 289, Jul. 21, 2000, pp. 415-419.
Kogelnik, H., et al, "Laser Beams and Resonators", Proceedings of the IEEE, vol. 54, No. 10, Oct. 1966, pp. 1312-1329.
Passilly, Nicolas, et al, "Simple interferometric technique for generation of a radially polarized light beam", J. Opt. Soc. Am. A, vol. 22, No. 5, May 2005, pp. 984-991.
Mushiake, Y., et al, "Generation of Radially Polarized Optical Beam Mode by Laser Oscillation", Proceedings of the IEEE, 60, Sep. 1972, pp. 1107-1109.
Jordan, Rebecca H., et al, "Lasing behavior of circular grating surface-emitting semiconductor lasers". J. Opt. Soc. Am. B, vol. 14, No. 2, Feb. 1997, pp. 449-453.
Miyai, E., et al, "Lasers producing tailored beams", NATURE, vol. 441, Jun. 22, 2006, p. 946.
Noda, Susumu, et al, "Polarization Mode Control of Two-Dimensional Photonic Crystal Laser by Unit Cell Structure Design", Science, vol. 293, Aug. 10, 2001, pp. 1123-1125.
Doerr, Christopher R., "360 Star Coupler for Detecting Subwavelength Features", IEEE Photonics Technology Letters, vol. 20, No. 17, Sep. 1, 2008, pp. 1440-1442.
Dragone, C., "Optimum design of a planar array of tapered waveguides", J. Opt. Soc. Am. A, vol. 7, No. 11, Nov. 1990, pp. 2081-2093.
Curtis, Jennifer E., et al, "Dynamic Holographic Optical Tweezers", Opt. Commun., 207, Apr. 17, 2002, p. 169 et seq.
Kitamura, Kyoko, et al, "Sub-wavelength focal spot with long depth of focus generated by radially polarized, narrow-width annular beam", Optics Express, vol. 18, No. 5, Mar. 1, 2010, pp. 4518-4525.
Zurita-Sanchez, Jorge R., et al, "Multipolar interband absorption in a semiconductor quantum dot. II. Magnetic dipole enhancement", J. Opt. Soc. Am. B, vol. 19, No. 11, Nov. 2002, pp. 2722-2726.
Loudon, R., The Quantum Theory of Light (Oxford University, 1973), Chapter 8, pp. 172-173.
Doerr, Christopher R., et al, U.S. Appl. No. 13/012,712, filed Jan. 24, 2011, "Core-Selective Optical Switches," 46 pages.
Essiambre, Rene-Jean, et al, U.S. Appl. No. 12/827,641, filed Jun. 30, 2010, "Multimode-Optical Communication", 46 pages.
Dragone, C., "Efficient N×N Star Coupler Based on Fourier Optics", Electronics Letters, vol. 24, No. 15, Jul. 1988, pp. 942-944.
Whitesides, George M., "The origins and the future of microfluidics", Nature, vol. 442, Jul. 27, 2006, pp. 368-373.
Zurita-Sanchez, Jorge R., et al, "Multipolar interband absorption in a semiconductor quantum dot. I. Electric quadrupole enhancement", J. Opt. Soc. Am. B, vol. 19, No. 6, Jun. 2002, pp. 1355-1362.
Foreign Communication From a Related Counterpart Application, Japanese Application No. 2013-557735, Japanese Office Action dated Aug. 21, 2014, 5 pages.
Foreign Communication From a Related Counterpart Application, Korean Application No. 2013-7023580, Notice of Preliminary Rejection dated Dec. 11, 2014, 9 pages.
Foreign Communication From a Related Counterpart Application, European Application No. 12755148.9, Extended European Search Report dated Sep. 15, 2014, 7 pages.

* cited by examiner

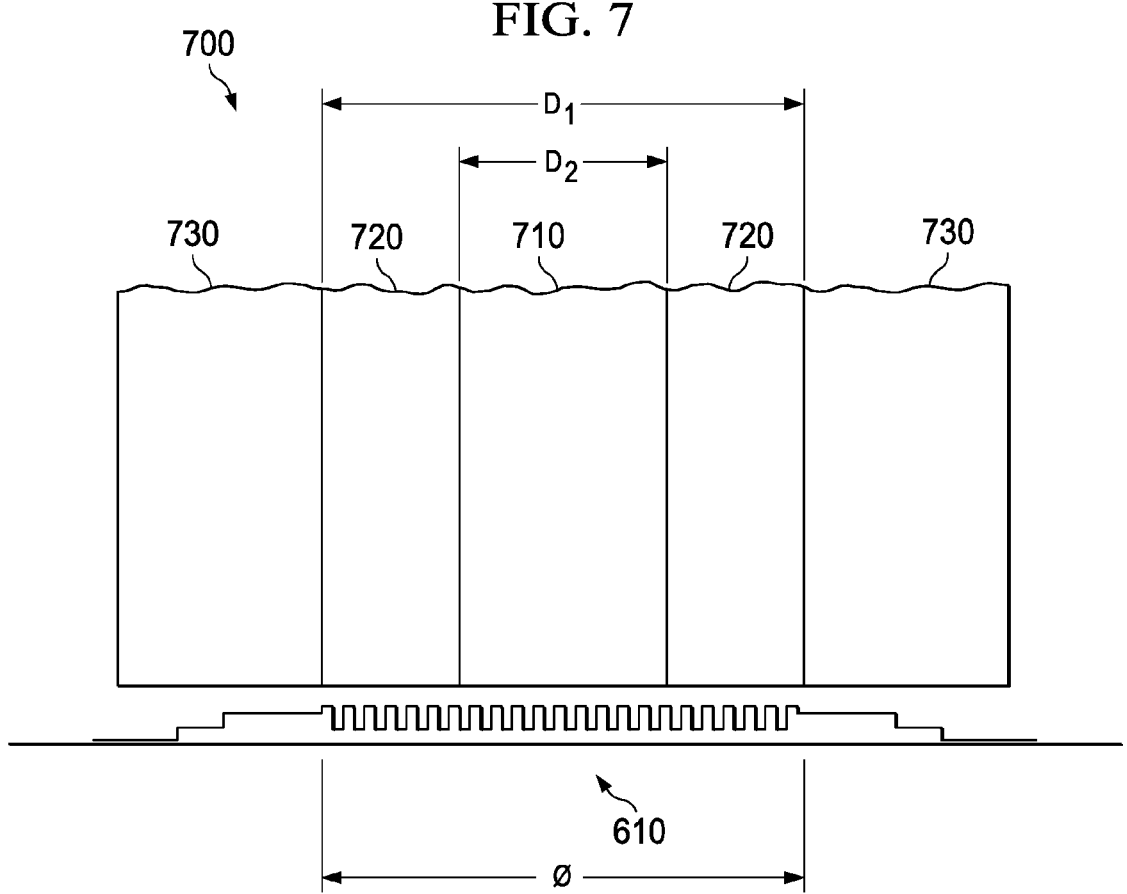

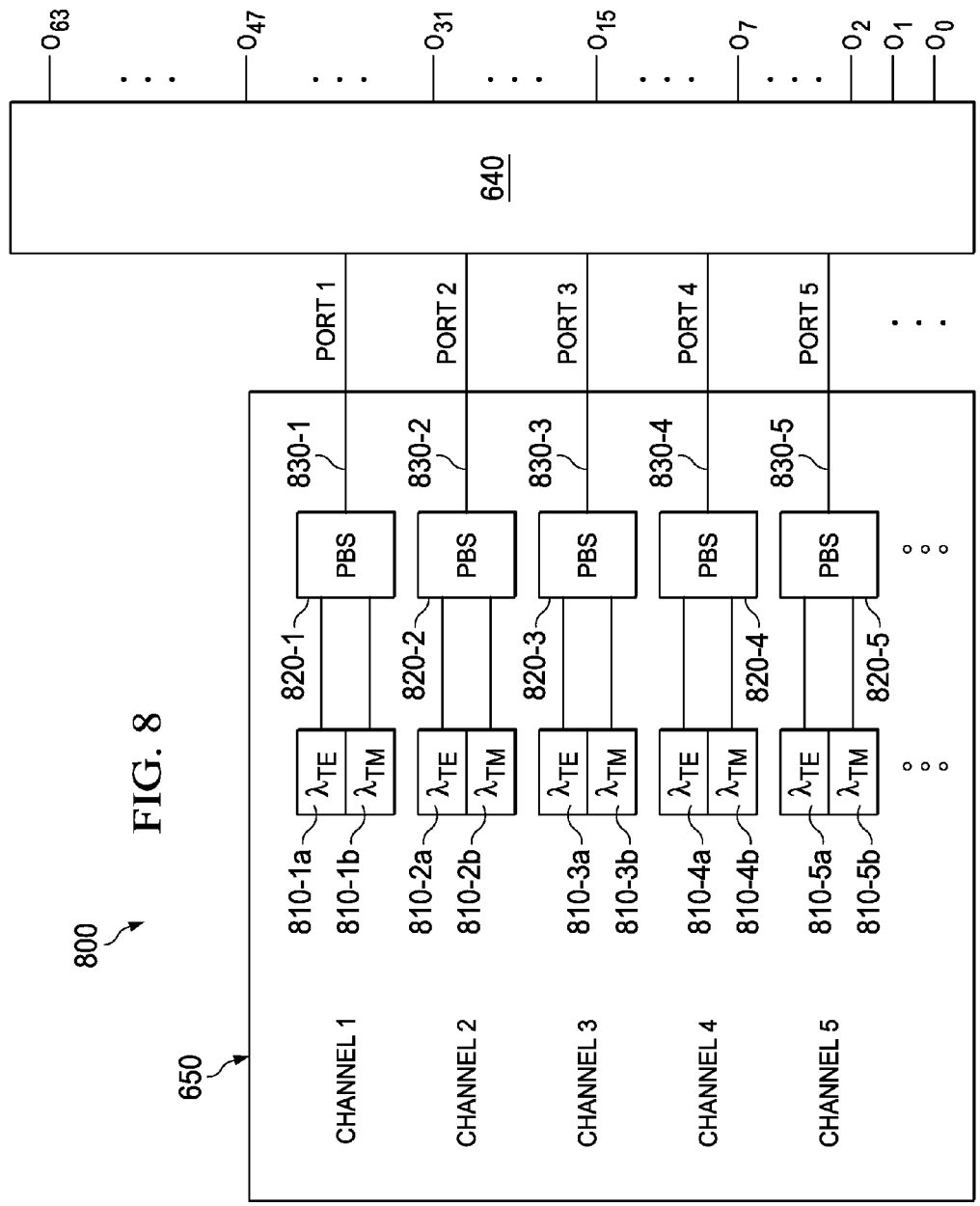

FIG. 9A1
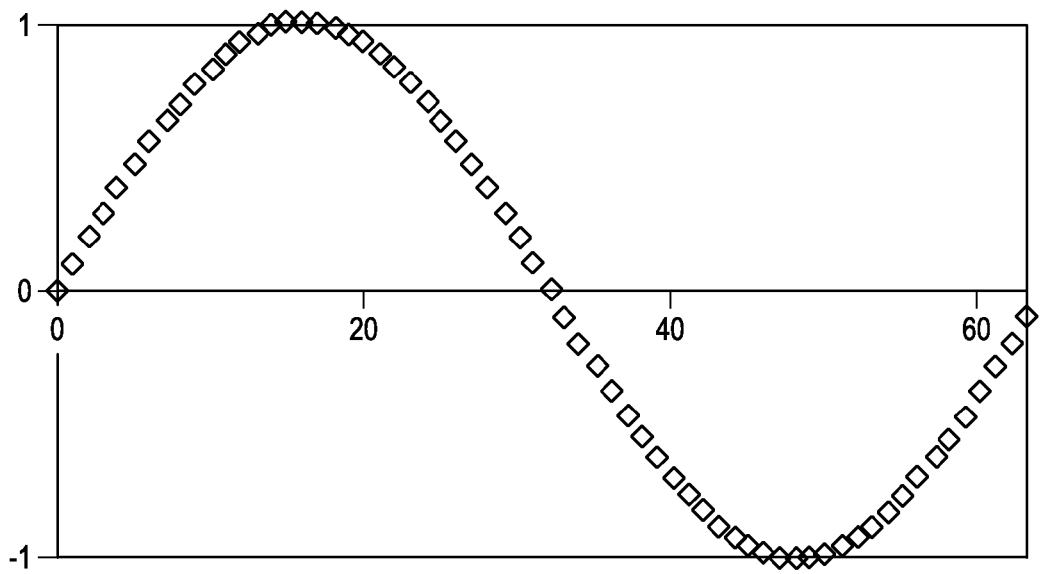
FIG. 9A2
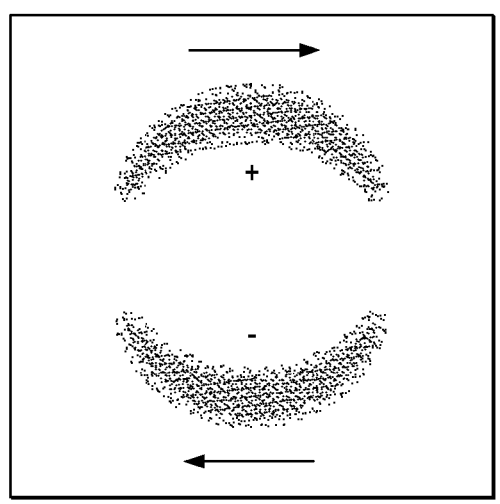

FIG. 9B1
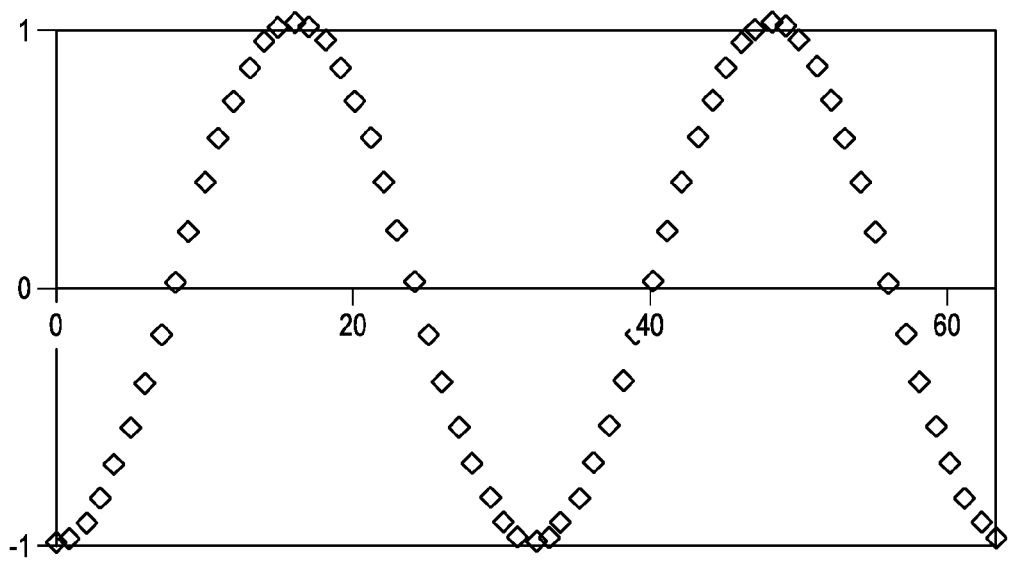
FIG. 9B2
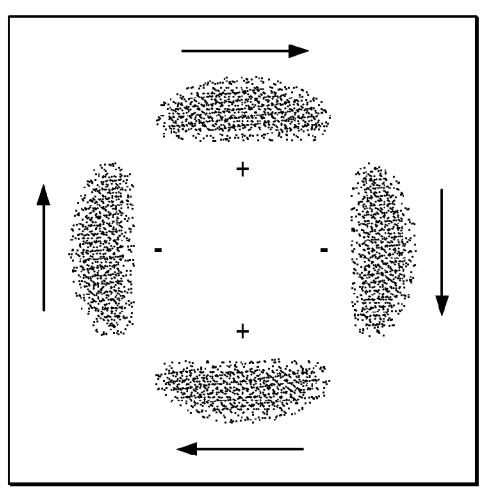

FIG. 9C1
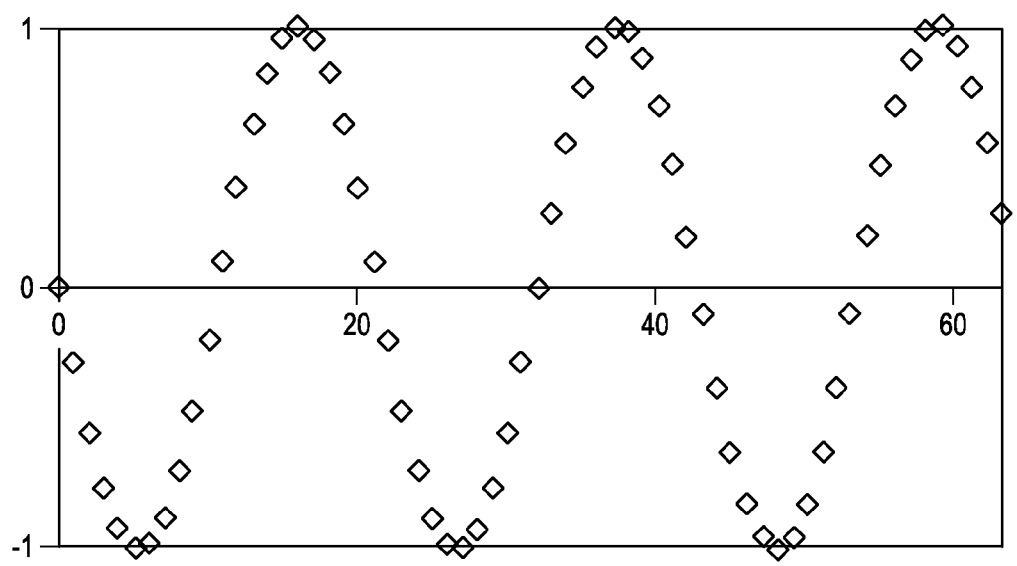
FIG. 9C2
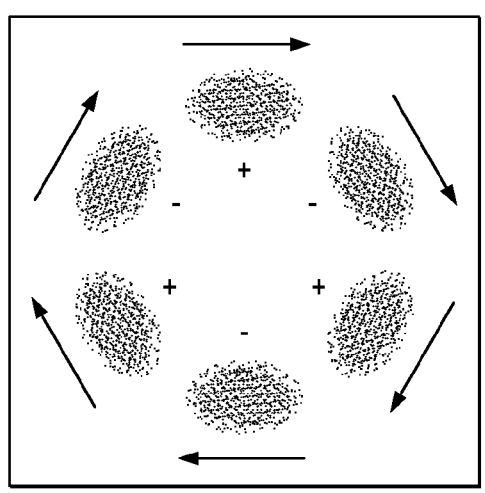

FIG. 9D1
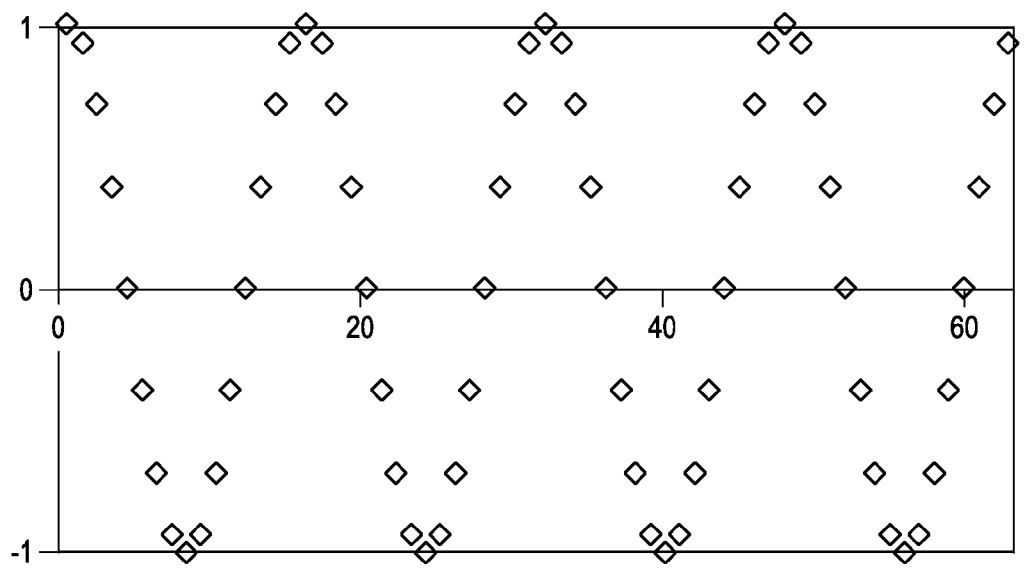
FIG. 9D2
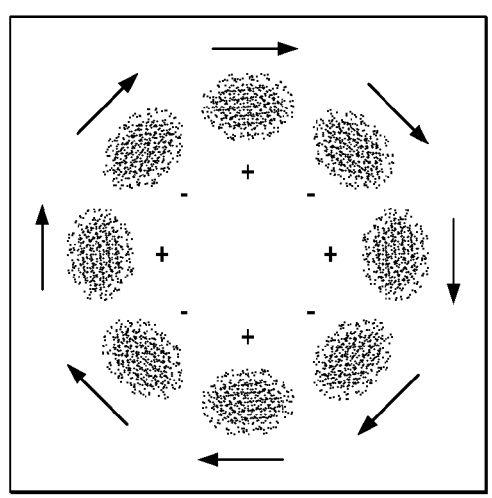

FIG. 9E1
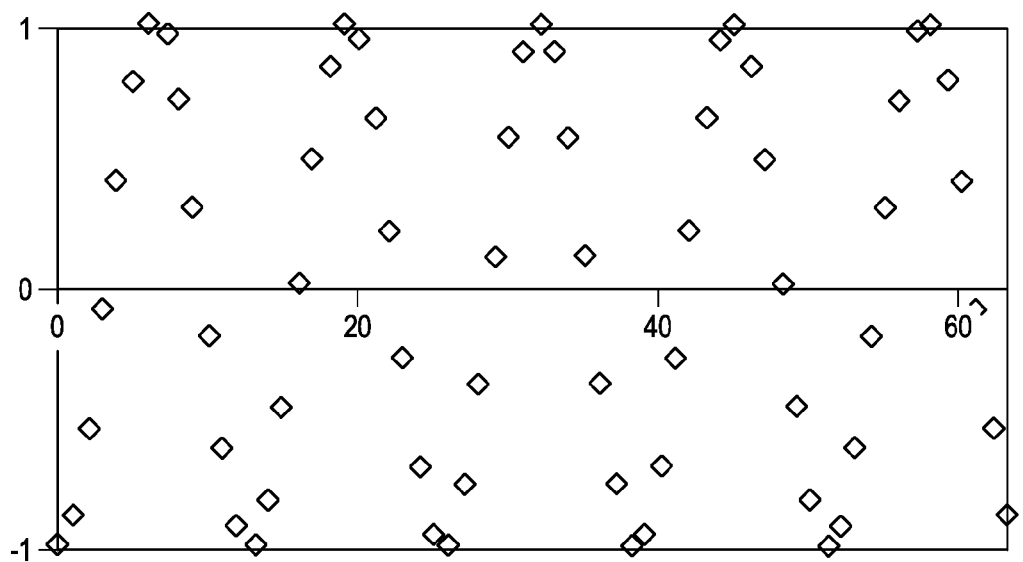
FIG. 9E2
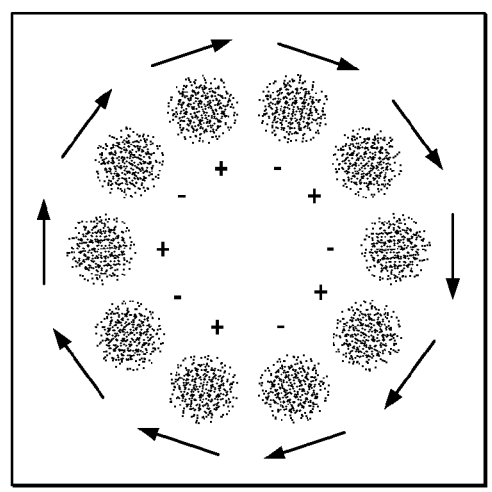

RADIAL OPTICAL COUPLER

CROSS-REFERENCE TO RELATED APPLICATIONS

This application is related to application Ser. No. 13/077,149 by Christopher Doerr and Peter Winzer (the '149 application) entitled, "Optical Fibers With Tubular Optical Cores", and application Ser. No. 13/041,364 by Christopher Doerr (the '364 application) entitled, "Polarization-Independent Grating Optical Coupler", each of which is filed concurrently herewith and incorporated herein by reference.

TECHNICAL FIELD

This application is directed, in general, to optical devices and methods of manufacturing and using optical devices.

BACKGROUND

Some optical fibers, e.g. multi-mode fibers, may be configured to propagate multiple spatial modes of an optical carrier. Such fibers offer the potential to carry more information than a single-mode fiber, as information may be multiplexed among the available propagation modes.

SUMMARY

One aspect provides an optical device that includes an optical grating coupler and a plurality of optical waveguides coupled thereto. The optical grating coupler is formed along a planar surface of a substrate, and includes a pattern formed by ridges concentrically located on the surface about a center thereon. Each adjacent pair of ridges is separated by a groove. Each waveguide of the plurality of waveguides is oriented about radially with respect to the center, and has a first end that terminates near an outermost one of the ridges. The first ends are about uniformly spaced along the outermost one of the ridges.

Another aspect provides a method. The method includes forming an optical grating coupler and a plurality of optical waveguides coupled thereto along a planar surface of a substrate. The optical grating coupler includes a pattern formed by ridges concentrically located on the surface about a center thereon. Each adjacent pair of ridges is separated by a groove. Each waveguide of the plurality of waveguides is oriented about radially with respect to the center, and has a first end that terminates near an outermost one of the ridges. The first ends are about uniformly spaced along the outermost one of the ridges.

BRIEF DESCRIPTION

Reference is made to the following descriptions taken in conjunction with the accompanying drawings, in which:

FIG. 7 illustrates relationships between a ring-core optical fiber and the circular grating coupler of FIG. 6;

FIG. 8 illustrates a portion of the optical device of FIG. 6, including optical signal sources and a star coupler configured to transmit polarization and propagation mode multiplexed optical signals to a ring-core optical fiber via the circular grating coupler of FIG. 6;

FIG. 9 illustrates polarization of light transmitted by planar optical waveguides to the circular grating coupler of FIG. 1, and propagation modes within a ring-core optical fiber excited by the polarized light;

DETAILED DESCRIPTION

Figure 1:
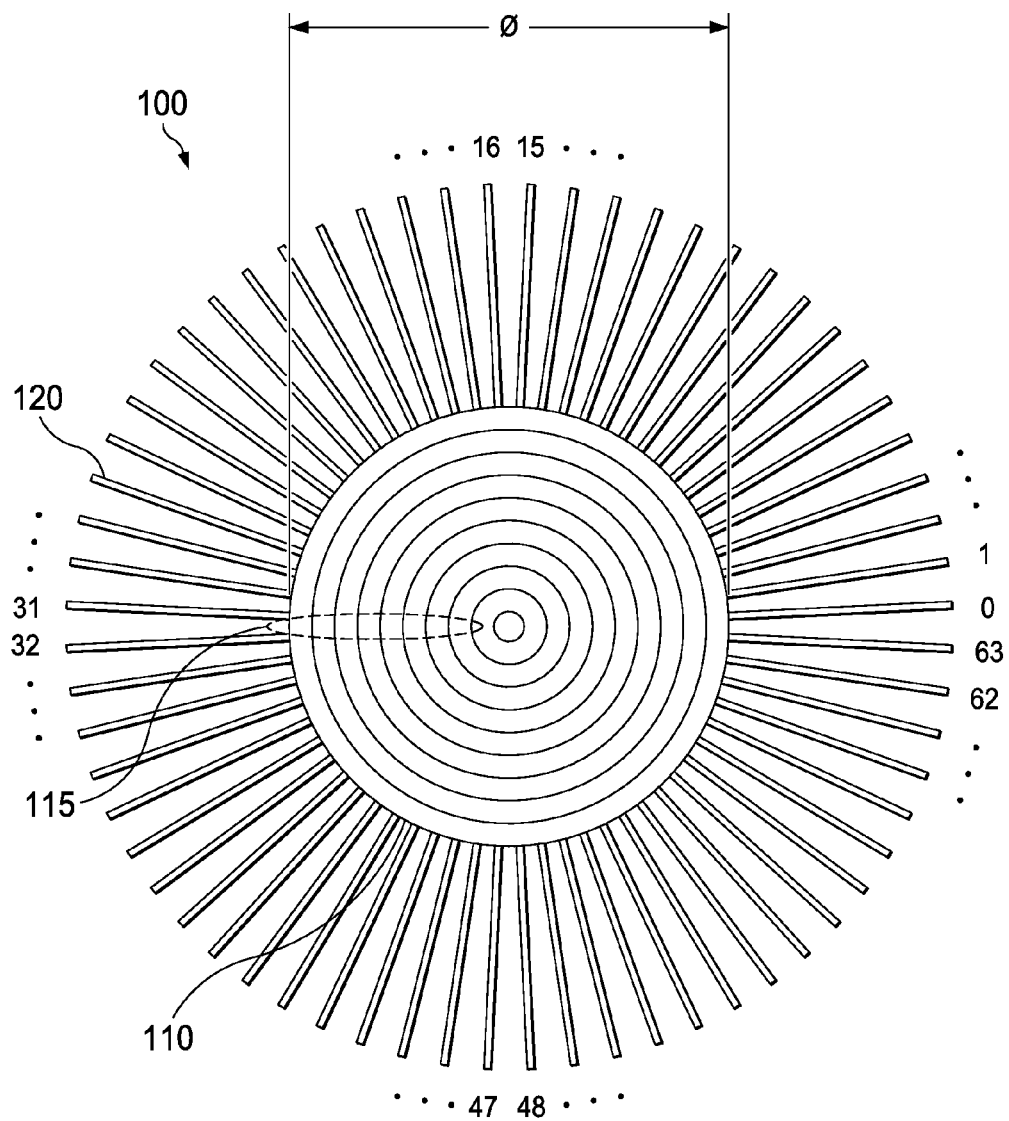
FIG. 1 illustrates an embodiment of a circular grating coupler of the disclosure, including concentric ridges and grooves, and radial waveguides.

FIG. 1 illustrates an optical device 100, e.g. a photonic integrated circuit (PIC). The device 100 includes a circular grating coupler 110 and a plurality of planar radial waveguides 120, e.g., single-mode waveguides, formed over a planar substrate (not shown). The circular grating coupler 110 includes a plurality of alternating concentric rings 115 of ridges and grooves. In some embodiments the concentric rings 115 are substantially radially symmetric, e.g. each ring closely approximates a circle or a regular polygon having a number of edges equal to or greater than the number of waveguides 120. The number of concentric rings 115 is not limited to any particular number, but may be constrained by other factors in various embodiments as discussed further below. In some embodiments, there may be additional patterning in the azimuthal direction, which has a sub-wavelength pitch, to achieve polarization independence, as described in the '364 application.

The illustrated embodiment includes e.g. 64 radial waveguides 120, though embodiments of the disclosure are not limited to any particular number thereof. In various embodiments the radial waveguides 120 are about evenly distributed along the perimeter of the circular grating coupler 110. Thus, e.g. in the illustrated embodiment the radial waveguides 120 are located at increments of $360°/64 \approx 5.6°$ around the perimeter of the circular grating coupler 110. For convenience, the radial waveguides 120 are numbered 0 . . . 63 counter-clockwise beginning at the 3:00 position of the device 100.

Each of the radial waveguides 120 terminates at or near an outermost ridge 210 (FIG. 2) of the circular grating coupler 110 at an intersection point. Herein a radial waveguide 120 is regarded as terminating at the outermost ridge 210 when the radial waveguide 120 physically touches the outermost ridge 210 or ends within one wavelength of an optical signal propagated by the radial waveguide 120, or ends within one wavelength of an optical signal that the radial waveguide 120 is configured to propagate. Thus the radial waveguide 120 may be optically coupled to the outermost ridge 210 even if not physically connected thereto. In some preferred embodiments the radial waveguides 120 are substantially parallel to radii of the concentric rings 115. Thus, in such embodiments the radial waveguides 120 are about normal to a tangent to the outermost ridge 210 at the intersection point.

The circular grating coupler 110 has a diameter Ø that is defined for convenience as the diameter of the outermost ridge 210. The diameter Ø is not limited to any particular value, but may be matched to a diameter of a fiber waveguide to which the device 100 is designed to couple. This aspect is discussed further below with respect to FIG. 7 and related description. In other embodiments, such as when the grating is chirped to form a focused light spot (as discussed below), the diameter Ø may be chosen as a function of the desired focal length and/or numerical aperture (NA) of the focused spot.

Figure 2A:
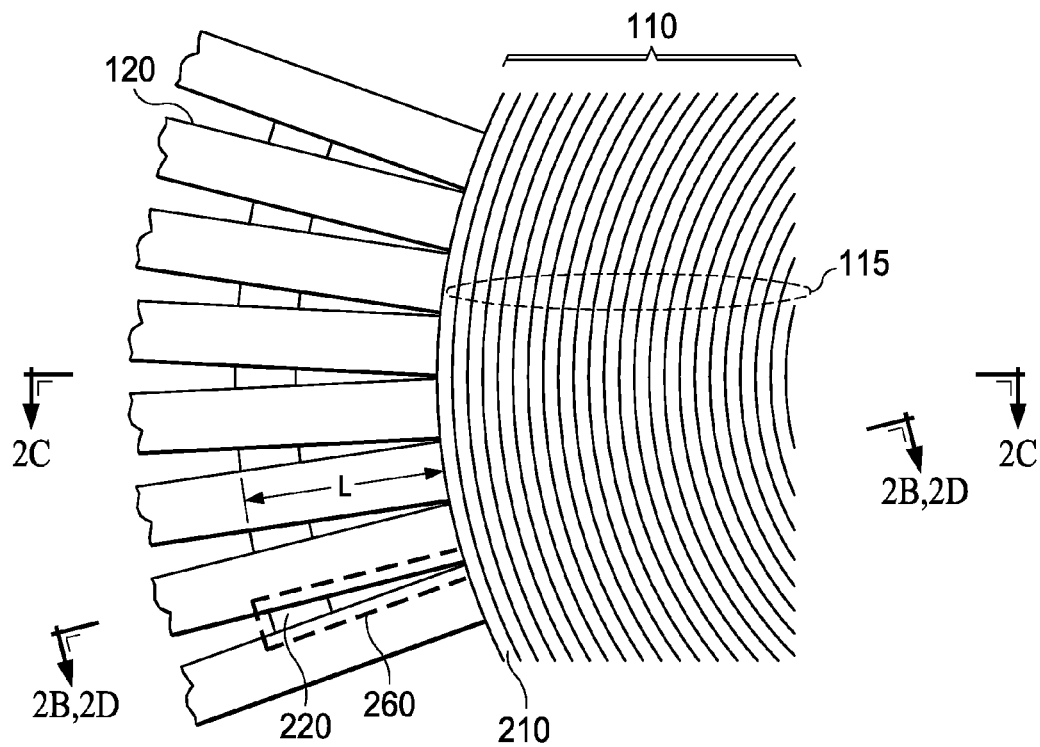
FIGS. 2A-2E illustrate aspects of the circular grating coupler of FIG. 1, including a transition portion located between two adjacent radial waveguides.
Figure 2B:
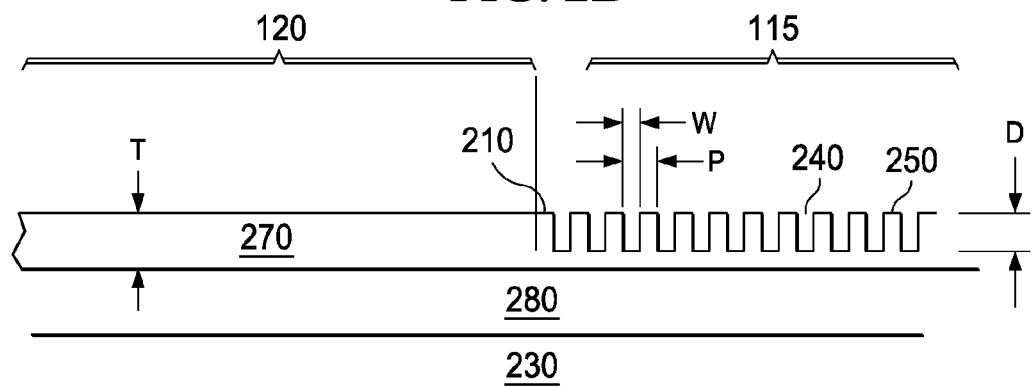
Figure 2C:
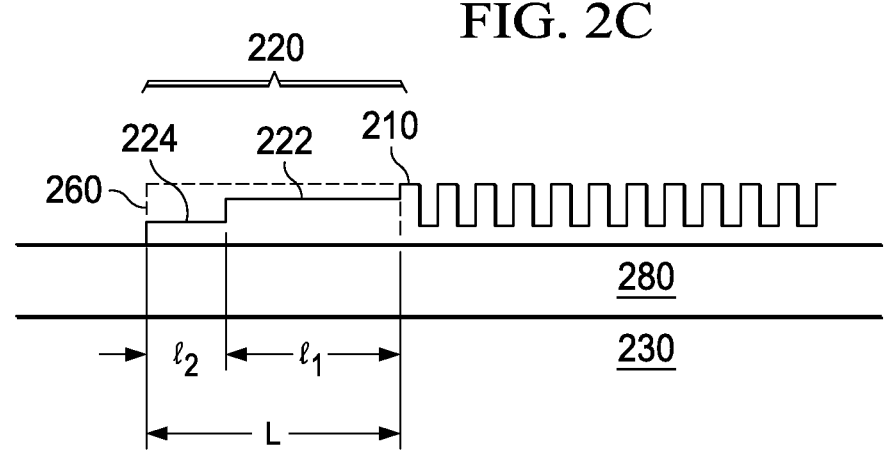

FIGS. 2A-2E illustrate portions of the optical device 100 in greater detail. FIG. 2A presents a plan view, including portions of a number of the concentric rings 115, and a number of the radial waveguides 120 terminating at the outermost ridge 210. FIG. 2B shows a sectional view taken through one of the radial waveguides 120. FIG. 2C shows a sectional view taken through an optional transition portion 220 (FIG. 2B) located between two of the radial waveguides 120.

The radial waveguides 120 and the concentric rings 115 are formed from a planar optical medium 270 located over a planar surface of the substrate 230 (FIG. 2B). The optical medium 270 may be any suitable material, e.g. semiconductors such as silicon or InGaAsP, or dielectrics such as $Si_3N_4$ or $SiO_2$. The discussion herein may refer to the medium as silicon without limitation. The substrate 230 may include a semiconductor wafer, e.g. a silicon wafer, or a portion of a semiconductor wafer. The device 100 may further include an optical isolation layer 280, e.g. $SiO_2$, between the substrate 230 and the circular grating coupler 110 and the radial waveguides 120.

Considering FIG. 2B, the circular grating coupler 110 includes grooves 240 that separate ridges 250. The grooves 240 may be formed in the optical medium 270, e.g. by conventional deep-UV lithography and plasma etch processes. The grooves 240 have a pitch P and a depth D that are not limited to any particular values. A width W of the grooves 240 may be constrained by the distance between edges of the grooves 240 that is determined as described below. The circular grating coupler 110 and the radial waveguides 120 have a thickness T that is not limited to any particular value.

The depth D, the thickness T and the period P may be selected to be suitable for the wavelength of light propagated by the device 100 and the refractive index of the optical medium. As a nonlimiting example, T may be about 220 nm and D may be about 95 nm for a 1.55 μm wavelength signal propagating in silicon. In some embodiments the pitch P is within a range of about 500 nm to about 1 μm, and the width is within a range from about 250 nm to about 500 nm. Additional aspects of P and W are discussed further below.

Considering FIG. 2C, the transition portion 220 partially fills a region 260. The region 260 is an approximately wedge-shaped volume, as illustrated in FIG. 2E, with side length L and height T that is bounded by the sidewalls of adjacent radial waveguides 120. It is believed that the presence of the transition portion 220 results in more efficient conversion between the circular Bloch mode in the radial waveguides 120 to a circular plane wave impinging on the circular grating coupler 110.

In various embodiments the optical medium within the region 260 is partially removed to form the transition portion 220. For example, in FIG. 2C the transition portion 220 includes two subportions 222 and 224. The subportion 222 has a first thickness less than T and the subportion 224 has a second thickness less than the first thickness. The subportion 224 may be formed by the same or a different patterning process that forms the grooves 240. The subportion 222 may be formed by a separate patterning step. In an embodiment a step height from the subportion 222 to the outermost ridge 210 is about 40 nm, and a step height form the subportion 224 to the subportion 222 is about 45 nm.

The subportion 222 extends a length $l_1$ from the outermost ridge 210, and the subportion 224 extends a length $l_2$ from the subportion 222. In some embodiments the length $l_1$ is the length at which about 5% of an optical signal propagating in one of the radial waveguides 120 overlaps a neighboring radial waveguide 120. In some embodiments the length $l_1+l_2$ is the length at which about 1% of the optical signal overlaps the neighboring radial waveguide 120.

Figure 2D:
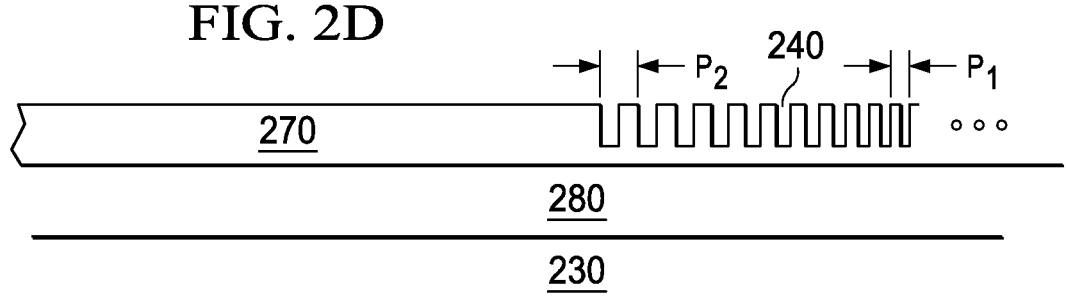
Figure 2E:
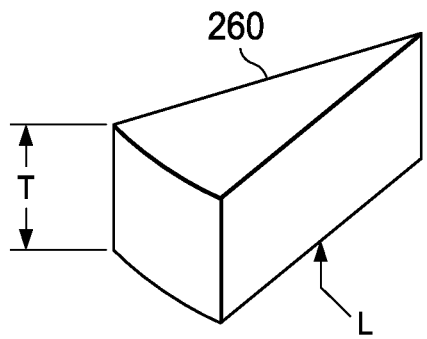

FIG. 2D illustrates an embodiment in which the grating period P of the grooves 240 varies with increasing radius of the grooves 240. In other words, in the illustrated embodiment the circular grating coupler 110 is chirped. When chirped, the circular grating coupler 110 may be used, e.g. to focus a light signal delivered to the circular grating coupler 110 by the radial waveguides 120 to form a sub-wavelength light beam, as described below.

Figure 5:
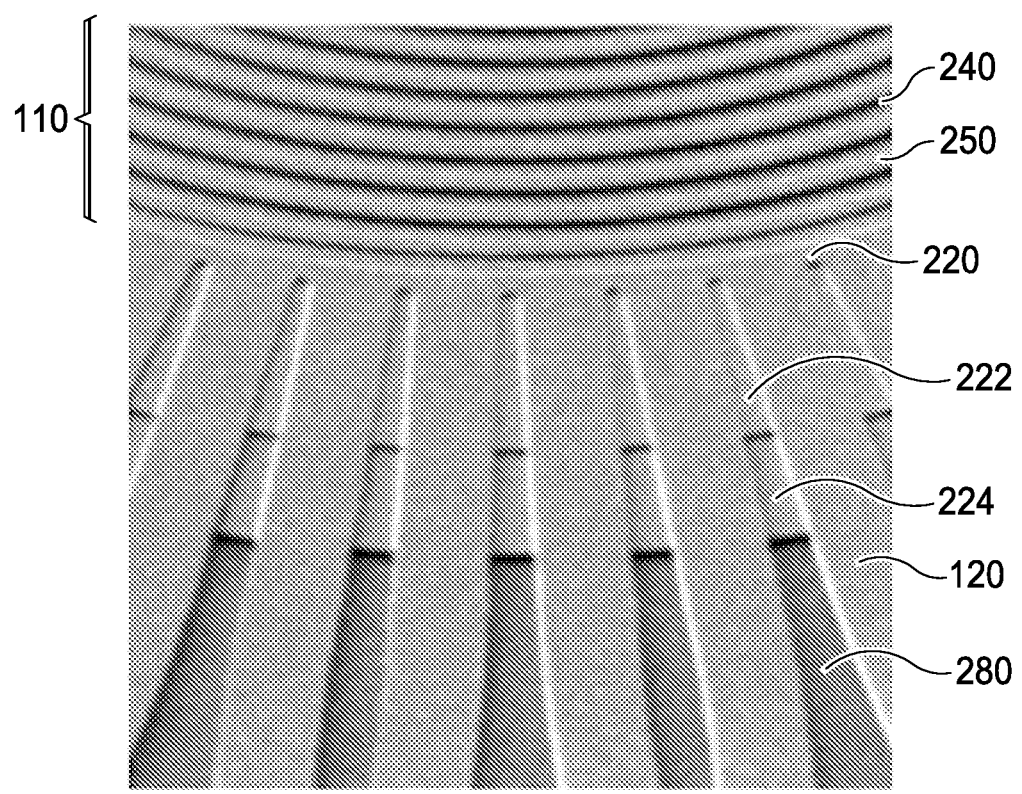
FIG. 5 illustrates a photomicrograph of a circular grating coupler, e.g. the circular grating coupler of FIG. 1.

FIG. 5 illustrates a photomicrograph from a scanning electron microscope of a portion of one particular embodiment of the optical device 100 where the radial waveguides 120 meet the circular grating coupler 110. The micrograph clearly shows the subportions 222, 224, the ridges 250 and the grooves 240, the outermost ridge 210, radial waveguides 120 and the optical isolation layer 280.

Figure 3:
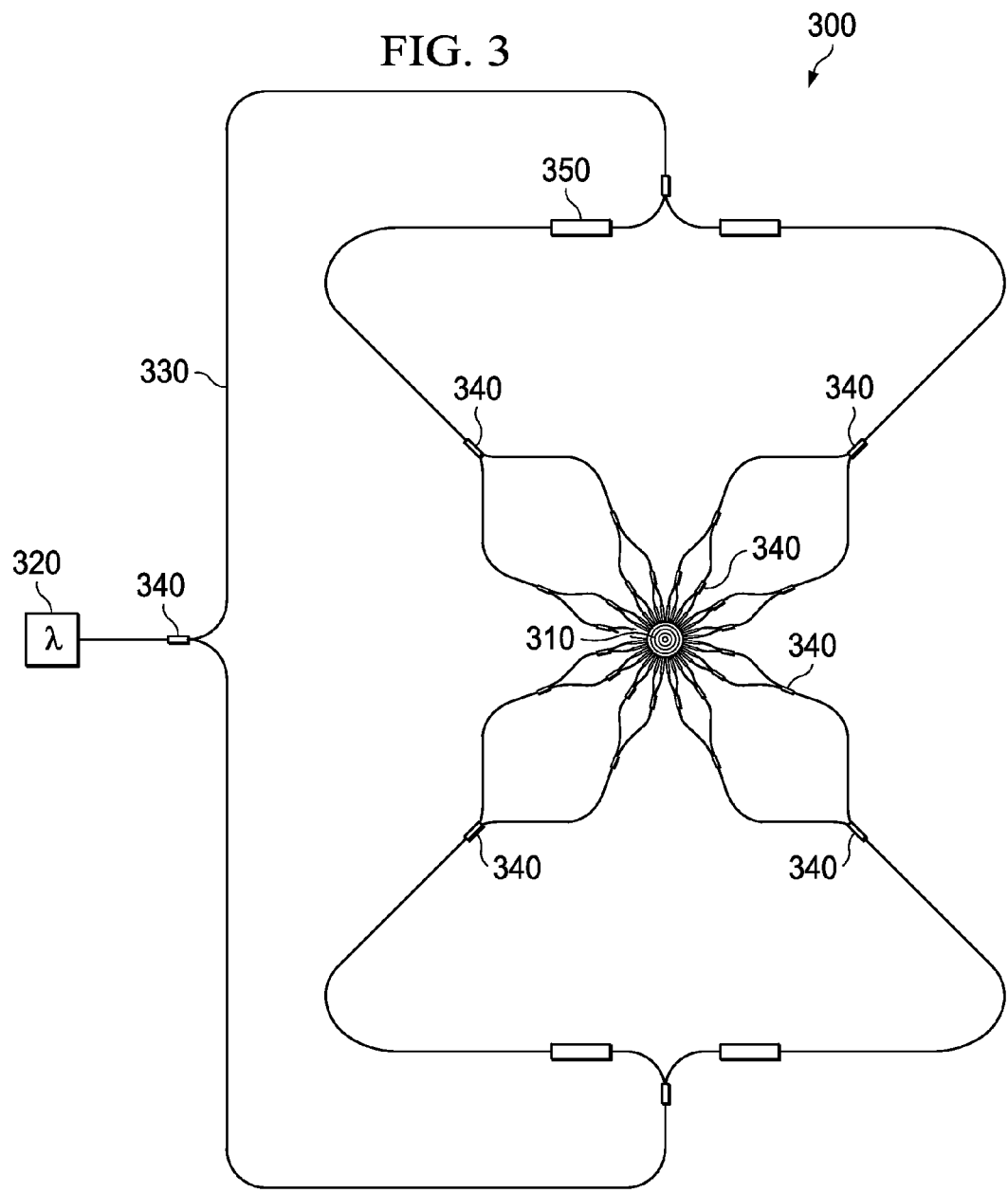
FIGS. 3 and 4 illustrate an optical device configured to e.g. produce a focused azimuthally polarized or radially polarized beam.

FIG. 3 illustrates an optical device 300, e.g. a PIC, that includes a chirped circular grating coupler 310. The chirped grating coupler 310 receives an optical signal produced by an optical source 320. Waveguides 330 distribute light from the optical source 320 to the chirped grating coupler 310 with substantially equal power and phase. For example, the waveguides 330 are configured such that the optical path length from the optical source 320 to each of the radial waveguides 120 is substantially equal. Splitters 340 divide light in successive branches to provide substantially equal power to each of the radial waveguides 120. Thermo-optic phase shifters 350 may be used in some of the branches to fine tune the optical path lengths thereof to account for, e.g. process variations in the branches.

The illustrated embodiment includes six levels of splitters 340 for a total of 64 portions of the optical signal delivered to the chirped grating coupler 310. Thus in this specific embodiment the radial waveguides are distributed around the perimeter of the chirped grating coupler 310 in increments of about 5.6°.

Figure 4:
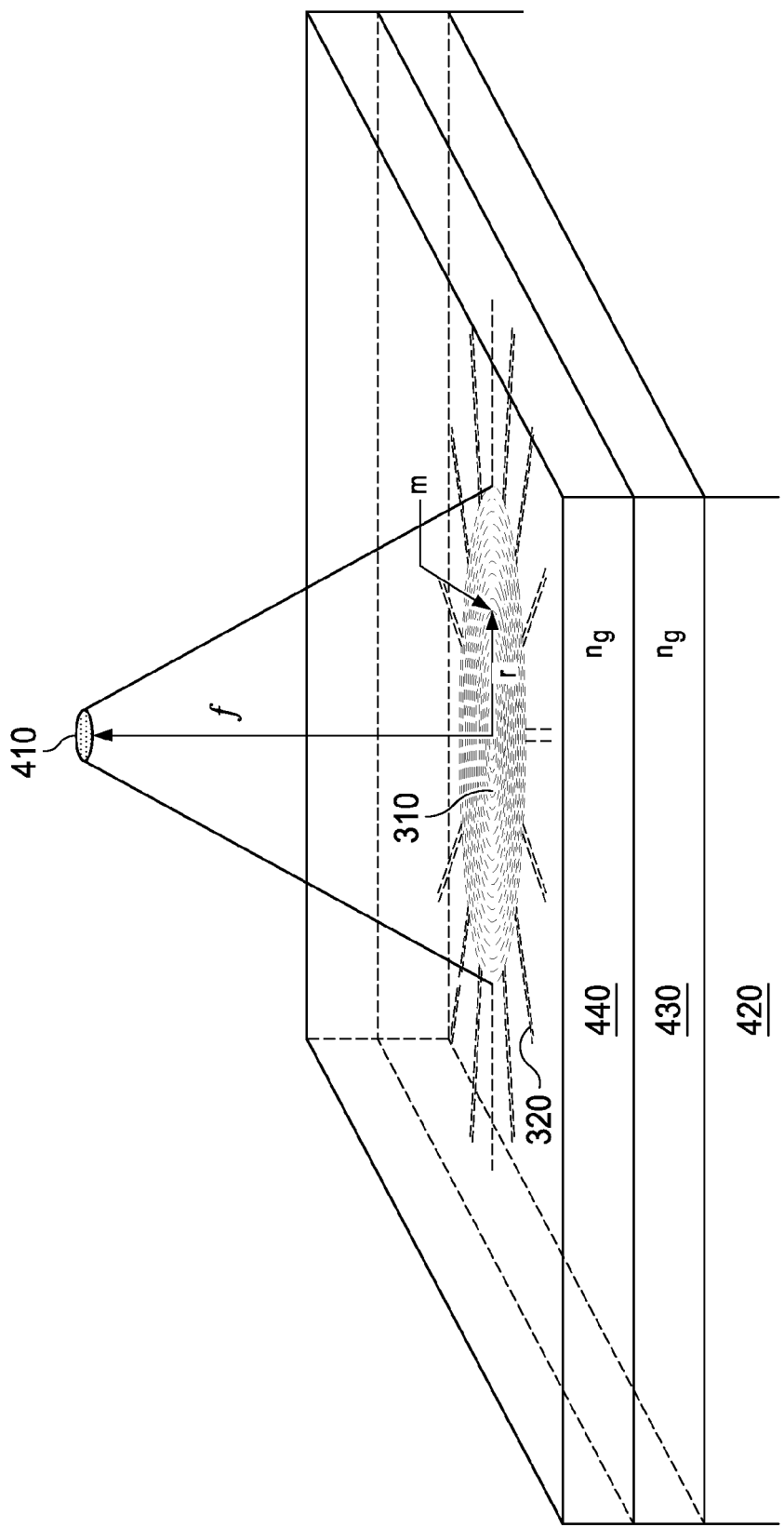

FIG. 4 illustrates a perspective view of a portion the optical device 300 including the chirped grating coupler 310 and radial waveguides 120. When an appropriately configured optical signal is delivered to the chirped grating coupler 310 a focused azimuthally polarized or radially polarized beam 410 may be formed at a distance $f$ above the chirped grating coupler 310.

An azimuthally or radially polarized beam can provide a sharper focus than a conventional uniformly polarized beam. It is believed that at the focal point a non-propagating intense longitudinal magnetic or electric field is formed for an azimuthally or radially polarized beam, respectively. This sharper focus can be used, e.g. to increase the resolution of lithography or imaging, increase optical data storage capacity of an optical storage medium, increase optical trapping strength, or better localize optical excitation of molecules.

In an embodiment the chirped grating coupler 310 and the radial waveguides 120 are formed over a silicon wafer 420 from a silicon layer about 220 nm thick on a thermal oxide layer 430 about 2 μm thick. An optional deposited oxide layer 440 about 2 μm thick covers the chirped grating coupler 310 and the radial waveguides 120. In an embodiment, the chirped grating includes 24 circular grooves 240.

When chirped, as in FIG. 4, the grating period P of the chirped grating coupler 310 may increase as a function of the radius in order to focus the beam at a distance $f$ above the chirped grating coupler 310. The radius r may be related to the $m^{th}$ edge of the grating by Equation 1:

$$r^2(n_g^2 - n_s^2) - 2rn_s\left[\left(\frac{1}{2} - m\right)\frac{\lambda}{2} + n_g\sqrt{\left(\frac{\lambda}{4n_s}\right)^2 + f^2}\right] + \\ f^2 n_g^2 - \left[\left(\frac{1}{2} - m\right)\frac{\lambda}{2} + n_g\sqrt{\left(\frac{\lambda}{4n_s}\right)^2 + f^2}\right]^2 = 0 \quad \text{Eq. 1}$$

where: m=1 to 2M, M being the number of periods P of the chirped grating coupler 310;

$n_s$ is the refractive index of the optical medium 270, e.g. silicon;

$n_g$ is the refractive index of the medium overlying the chirped grating coupler 310, e.g. SiO$_2$ (glass); and $\lambda$ is the free-space wavelength of the optical signal. The roots of Equation 1 may be determined and solved for the radius r for each of a number of edge diameters of the grooves 240.

Light coupled to the circular grating coupler 110 may be polarized as transverse electric (TE) or transverse magnetic (TM) modes. TE light may be used to generate an azimuthally polarized beam 410 and TM light may be used to form a radially polarized beam 410. In one embodiment using TE light, $\lambda$=1.55 μm and $n_s$=2.9 in silicon. The diameter of the chirped grating coupler 310 in this example is about 27 μm, with 24 grooves 240. The grating pitch P increases from about 540 nm at the center of the chirped grating coupler 310 to about 640 nm at the outer edge thereof. Using $n_g$=1.45 (about the refractive index of SiO$_2$), $f \approx 40$ μm. In an embodiment using TM light, for which $n_s$=2.1 in silicon, the chirped grating coupler 310 diameter is about 38 μm and $f \approx 60$ μm. The pitch P increase from about 640 nm to about 1080 nm. Under these conditions the NA of the focused azimuthally polarized beam 410 is about 0.46, and the NA of the focused radially polarized beam 410 is about 0.43. In other embodiments the NA may be increased by decreasing $f$ or by increasing the number of grooves, which may in turn require increasing the chirp of the chirped grating coupler 310.

Figure 6:
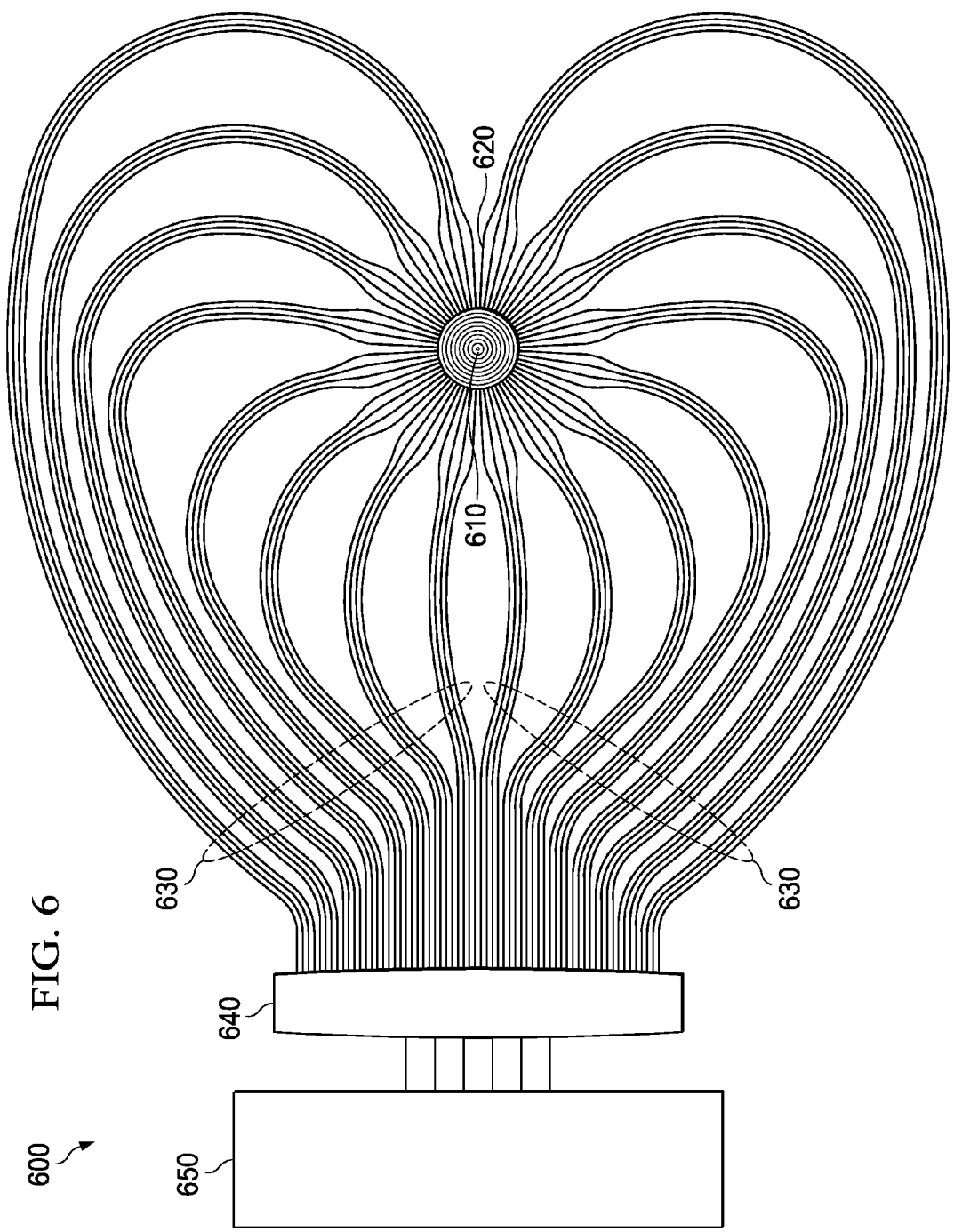
FIG. 6 illustrates an optical device using the circular grating coupler of FIG. 1, configured to excite a propagation mode in a ring-core optical fiber.

FIG. 6 illustrates another embodiment, a PIC 600, that includes a circular grating coupler 610. The circular grating coupler 610 may be used to couple optical signals between the PIC 600 and an optical fiber located over the circular grating coupler 610. The PIC 600 includes 64 radial waveguides 620, though a fewer or greater number may be used in other embodiments. In an embodiment the circular grating coupler 610 is unchirped, with a pitch P of about 560 nm. Planar waveguides 630 connect the radial waveguides 620 to a corresponding number of output ports of a star coupler 640. An optical source 650, discussed further below, is configured to provide optical signals to inputs ports of the star coupler 640.

The planar waveguides 630 are configured to maintain specific phase relationships between signals propagated therein and the circular grating coupler 610. Therefore, in some embodiments each radial waveguide 620 includes a phase shifter (not shown), such as a thermo-optical phase shifter, to ensure that each radial waveguide 620 has an optical path length that is an integer multiple of a wavelength $\lambda$ of the light used plus a constant value that is the same for all waveguides. In some embodiments the radial waveguides 620 are photolithographically defined such that each has about the same physical path length, whereby each physical path length is the same integer multiple of $\lambda$. In this embodiment phase shifters may be used to compensate for imprecision of the physical path lengths to ensure again that the optical path length for each waveguide is an integer multiple of a wavelength $\lambda$ of the light used plus a constant value that is the same for all waveguides.

FIG. 7 illustrates a sectional view of the circular grating coupler 610 and a ring-core optical fiber 700 located thereover. Ring-core optical fibers are described in detail in the '149 application, which has been incorporated by reference herein. In brief summary, the ring-core optical fiber 700 includes a central cylindrical cladding region 710, a tubular-core region 720 and a tubular cladding region 730. The refractive index of the tubular-core region 720 is higher than that of the cladding regions 710 and 730. Thus propagating modes within the ring-core optical fiber 700 are expected to remain substantially confined to or around the tubular-core region 720. Propagating modes may include multiple azimuthal and radial modes. The tubular-core fiber 700 has multiple azimuthal modes that are well suited for coupling to a radial optical coupler. Additional details of with the ring-core fiber 700 may be found in the '149 application, which refers to ring-core fibers as tubular core fibers, and is incorporated herein by reference.

The PIC 600 is configured to launch propagating modes of optical signals into the ring-core optical fiber 700, which may be oriented approximately normal to the PIC surface. In various embodiments the optical PIC 600 may convert plane-polarized optical signals on the PIC 600 to azimuthally polarized optical signals within the ring-core region 720. As described further below multiple optical signals may be propagated via different propagating modes, providing greater throughput than a single mode fiber link.

With continued reference to FIG. 7, the tubular-core region 720 has an outer diameter $D_1$ and an inner diameter $D_2$. In some embodiments the circular grating coupler 610 is formed such that the diameter Ø is about equal to the diameter $D_1$. Within the diameter $D_2$ the concentric rings of the circular grating coupler 610 are optional, as little coupling between the circular grating coupler 610 and the ring-core optical fiber 700 is expected to occur inside of $D_2$, and light inside $D_2$ may not propagate in the ring-core fiber. However, the scope of the disclosure includes embodiments in which the ring-core optical fiber 700 includes other propagating elements within $D_2$.

FIG. 8 schematically illustrates interconnection of the star coupler 640 and the optical source 650 in one specific embodiment of the PIC 600. The star coupler 640 includes inputs designated Port 1 through Port 5. While five input ports are shown, embodiments are not limited to any particular number of input ports. Moreover, one or more of the shown input ports may be unused or absent. The star coupler 640 has output ports $O_0$-$O_{63}$. The number of output ports is also not limited to any particular number. In various embodiments the number of output ports is equal to the number of radial waveguides 620, e.g. 64 in the illustrated embodiment.

Those skilled in the pertinent art will appreciate that a star coupler may be configured to divide the power of light presented at an input port equally among the output ports. (See, e.g., C. Dragone, Electron. Lett., p. 942, 1988, which is incorporated herein by reference in its entirety.) The phases of the light portions at the outputs typically follow specific phase relationships determined in part by geometrical aspects of the star coupler. Moreover, the star coupler is typically bidirectional, so ports may be configured as input ports or output ports. Using the star coupler 640 schematically illustrated in FIG. 8 as a representative example, the following provides a nonlimiting description of the operation of the star coupler 640 to aid understanding of the operation of the optical PIC 600. Those skilled in the optical arts will appreciate that the values provided in the following discussion are approximate, e.g. manufacturing variation may produce variation from the ideal values recited.

The star coupler 640 is configured such that when laser light is input to Port 1, the light output at output ports $O_0 \ldots O_{63}$ increments in total phase angle by $2\pi \cdot \pi/32 = {}^{63}\!/_{32}\pi$ radians from the output port $O_0$ to the output port $O_{63}$. That is, the incremental actual phase change between the k-th and (k+1)-th output ports $O_k$ and $O_{(k+1)}$, for $k \in [0, 63]$, is $\exp(i\delta)$, and $\delta = 2\pi/64 = \pi/32$ radians. Referring to FIG. 9, coupler phase plots 9A1, 9B1, 9C1, 9D1 and 9E1 illustrate the real part of the actual phase of the light output by the output ports $O_0 \ldots O_{63}$, i.e., the y-axis shows $\mathrm{Re}\{\exp(ik(\delta+\delta'))\}$ for an x-axis value of k, which is the index of the output port $O_k$, and $k \in [0, 63]$. Here $\delta'$ is an arbitrary phase shift to recognize that the circular grating coupler is about rotationally symmetric. Thus, e.g. $\delta'$ may be about $\pi/2$ in plot 9A1. The actual phase plot 9A1 shows that the light input to the Port 1 of the star coupler 640 produces light at the outputs $O_0 \ldots O_{63}$ that varies in total phase angle by one cycle of $2\pi$, over the 64 output ports and starts at 0 radians.

When the light is input to the Port 2, the light output at the ports $O_0 \ldots O_{63}$ increments in total phase angle by $4\pi \cdot \pi/16 = {}^{63}\!/_{16}\pi$ radians starting from the phase angle of $-\pi$ at the port $O_0$. That is, the incremental actual phase change between the k-th and (k+1)-th output ports $O_k$ and $O_{(k+1)}$, for $k \in [0, 63]$, is $\exp(i2\delta)$, and $\delta = 4\pi/64 = \pi/16$ radians when light is input to Port 2. This case is illustrated by the real part of the actual phase of the light at the various output ports $O_0 \ldots O_{63}$ as a function of output port index "k" in plot 9B1. Similarly, when light is input to Ports 3, 4 and 5, the light output at the ports $O_0 \ldots O_{63}$ increments in total phase angle by $6\pi$, $8\pi$ and $10\pi$, respectively, as respectively illustrated for the corresponding actual phases as a function of output port index "k" in phase plots 9C1, 9D1 and 9E1.

Each of the output ports $O_0 \ldots O_{63}$ is connected to one of the radial waveguides 620 of FIG. 6 in an azimuthally sequential manner. For example, the output port $O_0$ may be coupled to a radial waveguide 620 at 0°, the output port $O_1$ may be coupled to a radial waveguide 620 at 5.6°, and so on. Referring to the numbering scheme shown in FIG. 1, the output ports may be coupled to equivalently numbered radial waveguides 620. Accordingly the phase of the optical signals coupled to the circular grating coupler 610 advances in a counter clockwise direction by an integer multiple of $2\pi$ around the circular grating coupler 610 of FIG. 6.

Returning to FIG. 8, the optical source 650 provides optical signals to the input ports of the star coupler 640. The illustrated embodiment includes five optical channels. Each channel includes two optical signal sources 810. Thus, e.g. Channel 1 includes optical signal sources 810-1a and 810-1b. In an embodiment one of the optical signal sources 810 in each channel, e.g. 810-1a, is configured to produce TE polarized light. The other, e.g. 810-1b, is configured to produce TM polarized light. Each optical signal source 810 may be modulated to carry information by a suitable modulation technique, e.g. BPSK, QPSK, 8PSK, QAM, OOK, etc. The optical signals may be monochromatic, or may be wavelength multiplexed in each Channel 1-5.

Within each channel, a polarization beam splitter (PBS) 820 configured as a combiner may receive the TE and TM polarized signals from the signal sources 810. The PBS 820 then combines the TE and TM polarized signals to produce a polarization multiplexed signal 830 at the PBS 820 output.

The star coupler 640 operates to convert each of the signals 830 to a parallel pattern of mutually coherent optical signals with phases that vary incrementally therebetween as previously described. The pattern may excite an individual one of the propagation modes of the ring-core optical fiber 700 when these optical signals are coupled to the circular grating coupler 610.

Referring again to FIG. 9, fiber polarization plots 9A2, 9B2, 9C2, 9D2 and 9E2 illustrate calculated electric field amplitude of five different propagation modes of TE polarized signals within a ring-core optical fiber. The direction of the electric fields is as indicated by arrows next to the electric field amplitude. The directions show a clockwise azimuthal polarization of the electric fields. Similar plots of TM polarization propagation modes would show the electric field oriented radially outward for the center of the fiber. The propagation modes are substantially orthogonal, so cross-talk between propagation modes is expected to be low.

The illustrated propagation modes may be excited by stimulation by a suitably configured phase pattern of light around the circular grating coupler 610. In the phase plot 9A1, for example, the actual phase of the light transmitted to the perimeter of the circular grating coupler 610 varies over one period around the circular grating coupler 610, thereby exciting the dipolar propagation mode illustrated in the fiber polarization plot 9A2. In the phase plot 9B1 the phase varies over two periods around the circular grating coupler 610, thereby exciting the quadrupolar propagation mode illustrated in the fiber polarization plot 9B2. Similarly the phase patterns illustrated in phase plots 9C1, 9D1 and 9E1 stimulate the propagation modes illustrated in the fiber polarization plots 9C2, 9D2 and 9E2. It can be shown that similar propagation modes, but having orthogonal electric fields, may be stimulated by TM polarized light at the circular grating coupler 610 yielding five more orthogonal modes.

Figure 10:
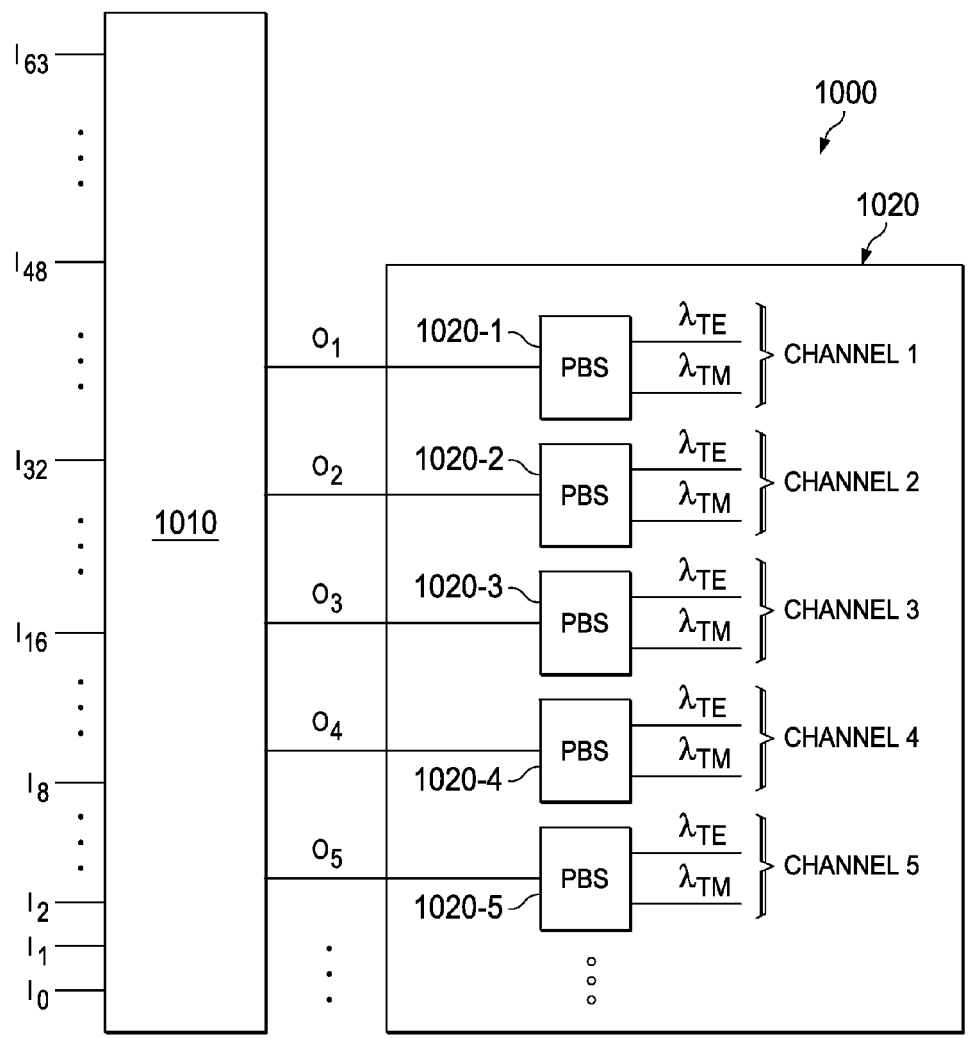
FIG. 10 illustrates an optical receiver configured to demultiplex polarization and propagation mode multiplexed optical signals from a ring-core optical fiber.

FIG. 10 illustrates an embodiment of a PIC 1000 that uses a receiving circular grating coupler (not shown) to couple an optical signal from a ring-core fiber to a planar optical waveguide. The PIC 1000 essentially acts as a polarization and propagation mode demultiplexer to reverse the polarization and propagation mode multiplexing provided by the PIC 600. Therefore in some embodiments the PIC 1000 is physically substantially identical to the PIC 600. Thus, the mapping described previously with respect to the star coupler 640 and the circular grating coupler 610 may describe the coupling between the receiving circular grating coupler and inputs $I_0$-$I_{63}$ of a star coupler 1010. Light received thereby is coupled to the input ports $I_0 \ldots I_{63}$ of the star coupler 1010 by planar waveguides. The received light may be polarization, e.g. TE or TM, multiplexed. The star coupler 1010 outputs from outputs ports $O_1 \ldots O_5$ received channels 1-5 to respective polarization beam splitters 1020-1, 1020-2, 1020-3, 1020-4 and 1020-5. The polarization beam splitters 1020-1, 1020-2, 1020-3, 1020-4 and 1020-5 separate TE and TM polarization components and provide the received components to the PIC 1000 for further optical processing and/or conversion to the electrical domain.

Figure 11:
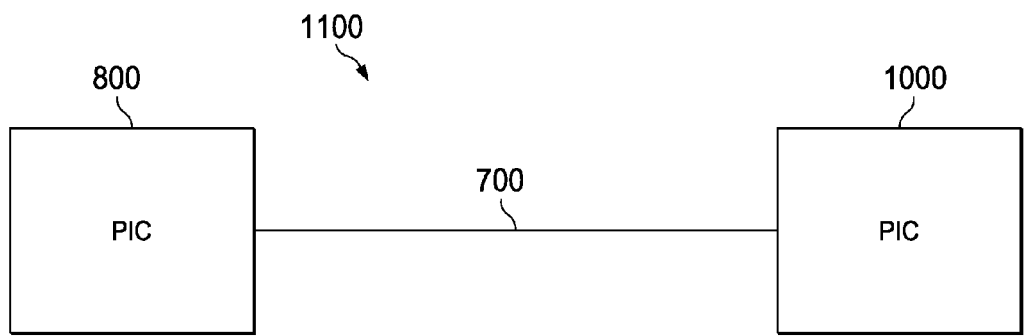
FIG. 11 illustrates a communication system configured to transmit data via a ring-core optical fiber.

FIG. 11 illustrates a system 1100 that includes the PIC 800, the PIC 1000 and the ring-core optical fiber 700 therebetween. The PIC 800 may modulate a plurality of optical communications channels for transmission via the propagating modes of the ring-core optical fiber 700. The illustrated embodiments of the PICs 800 and 1000 provide 5 propagation mode channels each with TE and TM polarization multiplexing, for a total of 10 orthogonal channels over the ring-core optical fiber 700. Phase shift keying and/or frequency division multiplexing may further increase the data capacity of the ring-core optical fiber 700.

Figure 12:
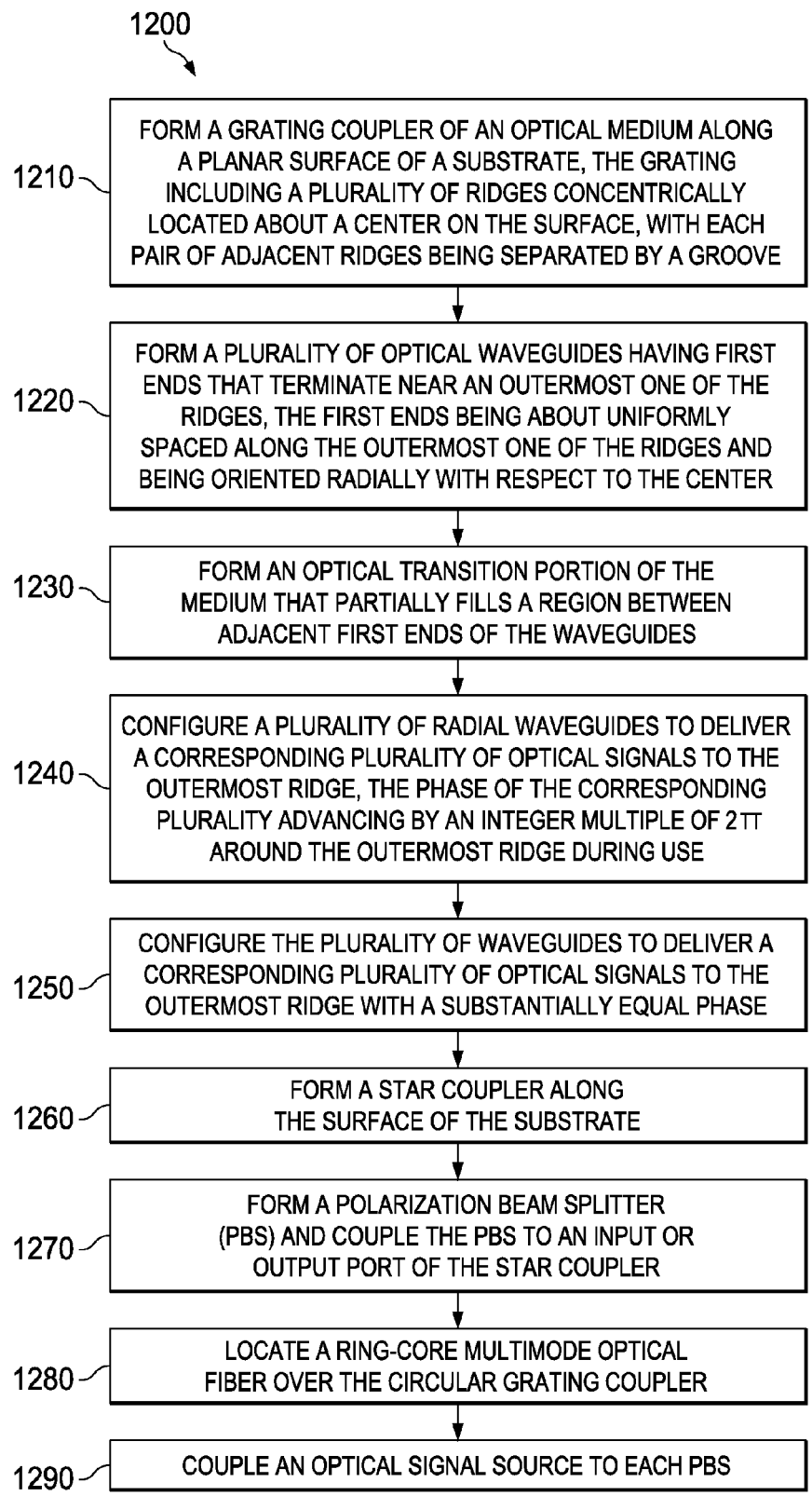
FIG. 12 illustrates a method, e.g. of forming optical devices of the disclosure, e.g. as described by FIGS. 1-11.

Turning to FIG. 12, a method 1200 is presented, e.g. for manufacturing an optical device. The steps of the method 1200 are described without limitation by reference to elements previously described herein, e.g. in FIGS. 1-11. The steps of the method 1200 may be performed in another order than the illustrated order.

A step 1210 includes forming a grating coupler, e.g. the circular grating coupler 110, of an optical medium along a planar surface of a substrate. The grating coupler includes a plurality of ridges 250 concentrically located about a center on the surface. Each pair of adjacent ridges is separated by a groove 240. Optionally the grating coupler is a circular grating coupler. Optionally, the grating coupler is chirped.

In a step 1220 a plurality of optical waveguides such as the radial waveguides 120 are formed of the optical medium. The optical waveguides have first ends that terminate near an outermost one of the ridges, e.g. the outermost ridge 210. The first ends are about uniformly spaced along the outermost one of the ridges, and are oriented radially with respect to the center.

In an optional step 1230 a transition portion of the medium is formed that partially fills a region between an adjacent pair of radial waveguides. Optionally the transition portion includes a first subportion having first thickness and a second subportion having a second thickness.

In an optional step 1240 the plurality of radial waveguides are configured to deliver a corresponding plurality of optical signals to the outermost ridge such that the phase of the corresponding plurality advances by an integer multiple of $2\pi$ around said outermost ridge during use.

In an optional step 1250 the plurality of waveguides is configured to deliver a corresponding plurality of optical signals to the outermost ridge with a substantially equal phase. For example, such configuring may include one or both of forming the plurality of waveguides, such as the waveguides 330, with substantially equal physical lengths, and forming phase adjusters such as the thermo-optic phase shifters 350 to change the optical path length of the waveguides.

An optional step 1260 includes forming a star coupler such as the star coupler 640 along the surface of the substrate. The star coupler has a number of output or input ports equal to the number of radial waveguides. The forming includes configuring optical connections to the output or input ports such that each output or input port is connected to a corresponding one of the radial waveguides.

In an optional step 1270 a polarization beam splitter such as the PBS 820 is formed and coupled to an input or output port of the star coupler. Optionally a plurality of such polarization beam splitters are formed. Each polarization beam splitter may be configured to combine first and second orthogonally polarized optical signals into a polarization-multiplexed optical signal.

In an optional step 1280 a ring-core multimode optical fiber is located over and optically coupled to the circular grating coupler, such as for forming the system 1100. Optionally the outermost ridge has a diameter about equal to an outer diameter of the ring-core.

In an optional step 1290 an optical signal source is coupled to each polarization beam splitter, such as for assembling the system 1100. Each optical signal source may be configured to provide a polarization-multiplexed optical signal.

Those skilled in the art to which this application relates will appreciate that other and further additions, deletions, substitutions and modifications may be made to the described embodiments.

What is claimed is:

1. An optical device, comprising:
an optical grating coupler formed along a planar surface of a substrate, said grating coupler including a pattern of concentric rings of ridges located on the surface, with each adjacent pair of the ridges being separated by a groove; and
a plurality of optical waveguides having first ends that terminate at an outermost one of the ridges, the first ends being about uniformly spaced along said outermost one of the ridges and being oriented radially with respect to a center of said concentric rings; and
a plurality of optical transition portions, each transition portion partially filling a region between adjacent ones of the first ends of the waveguides, wherein each of said transition portions includes a first subportion having a first thickness and a second subportion having a second thickness that is less than said first thickness.

2. The optical device of claim 1, wherein said pattern of ridges is radially chirped with respect to the center.

3. The optical device of claim 1, wherein said plurality of radial waveguides is configured to deliver a corresponding plurality of optical signals to said outermost one of the ridges with a substantially equal phase.

4. The optical device of claim 1, further comprising a star coupler having a number of output or input ports equal to a number of said plurality of radial waveguides, each of the output or input ports being connected to a corresponding one of said radial waveguides.

5. The optical device of claim 4, further comprising a plurality of polarization beam splitters, each polarization beam splitter being coupled to a corresponding port of said star coupler.

6. The optical device of claim 5, further comprising a plurality of optical signal sources, each of said polarization beam splitters being connected to two of said optical signal sources, one of said two being configured to produce TE mode light and the other of the two being configured to produce TM mode light.

7. The optical device of claim 1, further comprising a ring-core multimode optical fiber having an end located over and facing said circular grating coupler.

8. The optical device of claim 7, wherein said outermost ridge has a diameter about equal to an outer diameter of said ring-core.

9. An optical device, comprising:
an optical grating coupler formed along a planar surface of a substrate, said optical grating coupler including a pattern of concentric rings of ridges located on the surface, with each adjacent pair of ridges being separated by a groove;
a plurality of optical waveguides having first ends that terminate at an outermost one of the ridges, the first ends being about uniformly spaced along said outermost one of the ridges and being oriented radially with respect to a center of said concentric rings, and
wherein said plurality of optical waveguides is configured to deliver a corresponding plurality of optical signals to said outermost ridge, with a phase of each optical signal of said corresponding plurality of optical signals increasing incrementally along said outermost ridge thereby advancing by a nonzero integer multiple of $2\pi$ per round of said outermost ridge.

10. The optical device of claim 9, further comprising a plurality of optical transition portions, each transition portion partially filling a region between adjacent ones of the first ends of the waveguides.

11. The optical device of claim 1, wherein said pattern of ridges is radially chirped with respect to the center.

* * * * *